United States Patent
Perentes et al.

(10) Patent No.: US 9,265,376 B2
(45) Date of Patent: Feb. 23, 2016

(54) DEVICE AND METHOD USING CENTRIFUGATION FOR EXTRACTING A LIQUID AND HEAT LOSS COMPENSATING MEANS

(75) Inventors: Alexandre Perentes, Lausanne (CH); Christian Jarisch, Lutry (CH); Jean-Luc Colantonio, Domdidier (CH); Zbynek Struzka, Fribourg (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/148,178

(22) PCT Filed: Feb. 3, 2010

(86) PCT No.: PCT/EP2010/051318
§ 371 (c)(1),
(2), (4) Date: Aug. 5, 2011

(87) PCT Pub. No.: WO2010/089329
PCT Pub. Date: Aug. 12, 2010

(65) Prior Publication Data
US 2011/0293805 A1  Dec. 1, 2011

(30) Foreign Application Priority Data
Feb. 6, 2009  (EP) .................................... 09152320

(51) Int. Cl.
*A47J 31/22*  (2006.01)
(52) U.S. Cl.
CPC ...................................... *A47J 31/22* (2013.01)

(58) Field of Classification Search
CPC .................................. A47J 31/32; A47J 31/22
USPC ......... 99/289 R, 287; 426/433, 435; 392/479, 392/485
See application file for complete search history.

(56) References Cited

U.S. PATENT DOCUMENTS

| | | | | |
|---|---|---|---|---|
| 3,282,703 | A * | 11/1966 | Broadhurst | 426/433 |
| 6,459,854 | B1 * | 10/2002 | Yoakim et al. | 392/479 |
| 2010/0178392 | A1 * | 7/2010 | Yoakim et al. | 426/80 |
| 2011/0189362 | A1 * | 8/2011 | Denisart et al. | 426/433 |

FOREIGN PATENT DOCUMENTS

| | | |
|---|---|---|
| DE | 42 40 429 A1 | 6/1994 |
| DE | 44 41 026 A1 | 5/1996 |
| EP | 0280794 A1 | 9/1988 |
| EP | 1 253 844 B1 | 11/2002 |
| EP | 1 380 243 B1 | 1/2004 |
| EP | 1 913 851 B1 | 4/2008 |

(Continued)

OTHER PUBLICATIONS

International Search Report, PCT/EP2010/051318, mailed May 21, 2010.

*Primary Examiner* — Jianying Atkisson
(74) *Attorney, Agent, or Firm* — Winston & Strawn LLP

(57) ABSTRACT

A method for producing a liquid extract from food ingredients in a beverage producing device that has a brewing unit driven in centrifugation. The method includes providing food ingredients in the brewing unit, supplying heated liquid in the brewing unit, centrifuging the brewing unit thereby generating centrifugal forces forcing liquid to flow through the food ingredients, and dispensing the liquid, along with an operation for compensating the thermal losses of the liquid extract in the brewing unit or the collecting unit.

13 Claims, 4 Drawing Sheets

(56) References Cited

FOREIGN PATENT DOCUMENTS

| EP | 2000062 A1 | 12/2008 |
| GB | 861 182 | 2/1961 |
| WO | WO 2008/148601 A1 | 12/2008 |
| WO | WO 2008/148656 A1 | 12/2008 |

* cited by examiner

DEVICE AND METHOD USING CENTRIFUGATION FOR EXTRACTING A LIQUID AND HEAT LOSS COMPENSATING MEANS

This application is a 371 of International Patent Application PCT/EP2010/051318 filed Feb. 3, 2010.

FIELD OF THE INVENTION

The present invention relates to a device and method for producing a liquid comestible from food ingredients, such as coffee powder, by passing a liquid through the ingredients using centrifugal forces. In particular, the invention relates to an improved device and method whereby the liquid comestible is discharged at a suitable hot temperature after centrifugation.

BACKGROUND OF THE INVENTION

It is known to prepare beverages by separating a mixture consisting of brewed coffee and coffee powder with centrifugal forces. Such a mixture is obtained by the interaction of hot water and ground coffee powder for a defined time. The water is then forced through a screen, on which screen powder material is present.

The existing centrifugal systems suffer the inconvenience that the liquid extract discharged from the device comes at a too low temperature. In particular, the liquid extract is cooled down in the collecting device by heat exchange with the extensive surfaces of the collector of the device. Indeed, according to the principle of the centrifugal process, the brewing unit is rotated along a central axis to form a thin layer or jets of liquid impacting on a substantially tubular impact surface. The liquid comes in contact with and drip from a surface that can be equal, for instance, to a first impact surface if when it is a pure cylinder may have an area of at least about 500 mm². Furthermore, the liquid is normally collected in a U-shaped cavity that leads to at least one dispensing duct forming again extensive areas of contact with the extracted liquid. Furthermore, the receptacle such as a cup further cools the liquid down unless it has been heated before being placed under the device for the reception of the liquid.

Furthermore, it is known that certain beverage ingredients, such as roast and ground coffee, must be brewed with a heated liquid, e.g., hot water, within a particular range of temperature to ensure the full extraction of the ingredients including the capture of the desired aroma compounds. Therefore, the liquid supplied in the brewing unit cannot be overheated to compensate for the temperature losses endured by the liquid after extraction as it would negatively affect the quality of extraction. The range of temperatures for an optimal brewing such as for coffee or tea must be so respected for ensuring the best quality of the final beverage. Furthermore, other quality characteristics of the coffee beverage must be preserved during preparation such as the head of foam called "crema".

The present invention aims at providing a device and a method for compensating at least partially the thermal losses of the beverage (or liquid extract) during its production by centrifugation and so allow the delivery of the beverage at a suitable temperature of service.

The invention also aims at providing a device and method that preserves the gustative and foam characteristics of a coffee beverage.

SUMMARY OF THE INVENTION

In one aspect, the present invention relates to a beverage production device for preparing a liquid extract by interaction between a liquid and food ingredients to form the liquid extract by effect of centrifugation of the liquid passing through the ingredients comprising:
 a brewing unit for receiving the food ingredients,
 a collecting unit for collecting the liquid extract centrifuged outside the centrifugal unit,
 driving means connected to the centrifugal unit for driving the centrifugal unit in rotation,
 liquid supply means being connected to the centrifugal unit to supply liquid in the centrifugal unit,
 a heater for heating the liquid supplied in the centrifugal unit,
 wherein it comprises additional heating means arranged to heat the liquid extract after, when or before it leaves the brewing unit.

Preferably, the temperature of the liquid extract leaving the device is controlled to be no more than 10 degrees lower, preferably no more than 8 degrees lower than the temperature of the supplied heated liquid in the brewing unit.

More particularly, the additional heating means can be thermally associated to either one or a combination of:
a) the brewing unit,
b) the collecting unit and,
c) the air gap between the brewing and the collecting unit.

The additional heating means can heat the liquid extract on different heating principles. For this, the additional heating means comprises any one or a combination of the following heating elements: convection, radiant and conduction heating elements.

In more particular modes, the heating element comprises an electrical resistance, a "thick film", a hot air blower, a heat exchanger, a steam generator, an induction coil, an infrared heater, and combinations thereof.

For instance, the brewing unit comprises a rotating drum and a lid at least partially closing said drum wherein at least one of these elements is associated with at least one of said heating elements. In particular, the rotating drum and lid can be associated to form at least one restriction for the liquid for creating at least one thin layer or jet of liquid leaving the brewing unit at high velocity by the effect of centrifugation. The restriction can be formed by a fixed outlet or a series of fixed outlets of small cross-sections or, alternatively, by a restriction valve which opens or enlarges as a result of the pressure of liquid exerting at the periphery of the brewing unit against said valve such as in international patent publication WO2008/0148656.

The brewing unit can be configured to receive a dose of food ingredients in a portioned package such as a capsule or pod. Therefore, the drum may be sized and shaped to form a capsule or pod holder in which is seated a capsule or pod before the brewing operation. The lid may comprise means for injecting the liquid in the capsule or pod and may additionally be provided with inlet piercing means to allow the intrusion of a liquid injection lance. The lid may also comprise at its peripheral outlet piercing means to provide at least one, preferably several peripheral outlets in the capsule or pod for enabling the exit of the liquid from the portioned package. Of course, the pod may as well be a filter pod comprising filter walls permeable to liquids and so which do not require to be pierced.

In another mode, the drum comprises a filter such as a cylindrical screen wall. The screen wall may be situated at a distance from the peripheral outlets of the brewing unit so as to leave a certain volume for the liquid extract before it reaches the outlets. In this mode, the drum is intended to receive loose food ingredients, e.g., ground coffee which is not prepacked in a portioned packaged. The heating elements can be embedded in the wall of the drum and/or in the lid. For instance, heating elements such as an electrical resistance or a thick film are localized at the peripheral outlet area of the brewing unit to heat the liquid as it leaves the brewing unit under a thin layer or several jets.

The collecting unit may comprise an impact wall situated at a distance from the liquid outlet of the brewing unit for receiving said centrifuged liquid extract. The impact wall may be associated to said heating elements. For instance, the heating elements can be at least one electrical resistance which is embedded in the wall or a thick film which is positioned adjacent said wall or printed on said wall. The impact wall can be placed a short distance from the outlet(s) of the brewing unit, for instance, between 5 to 25 mm.

The collecting unit may also comprise a collecting cavity of annular shape and at least one dispensing duct. At least one of these elements may be associated to the additional heating means, e.g. one or more heating elements. The collecting cavity can be a member which is separate from the impact wall, i.e., which can be situated below the wall. Alternatively, the collecting cavity can be a member which is an integral part of the impact wall, e.g., which extends upwards from the bottom of the cavity along and at a distance from the brewing unit. The dispensing duct can be a tubular part which is made of one block with the cavity or be associated (e.g., fixed) to it. Several dispensing duct may be provided to distribute the liquid extract in different receptacles (e.g., in two cups).

In a mode, when the collecting cavity is associated to additional heating means, the collecting unit comprises a impact wall which is dissociated from any additional heating means. By "dissociated" it is meant that the wall is not directly heated by heating means that would provide a certain heat compensation by liquid impacting the wall. Indeed, it has been experienced that during impact of the centrifuged liquid with the impact wall, i.e., as soon as liquid leaves the brewing unit (e.g., when it is projected from the capsule) with high centrifugal forces, the foam bubbles tend to collapse against a heated surface. As a result, coffee crema can be seriously deteriorated by a heated impact wall. Therefore, it is preferred to compensate heat loss in the collecting unit only in the receiving cavity and to maintain the compact wall at or close to the ambient temperature to avoid collapsing of the foam bubbles.

In a possible mode, the heating means comprise gas convection means for heating the centrifuged liquid as it leaves the brewing unit. The air or gas can be heated by heat exchange with a heater and be circulated actively or passively such as by a structure promoting air current in the free space between the brewing unit and the collecting unit or in the collecting unit. In a possible mode, the air volume is maintained hot in the collecting unit without particular circulation otherwise provided by the dynamic of the liquid itself. In a particular mode, the additional heating means are, for instance, convection means such as hot air blowing means arranged for providing a heated air current in a direction crossing the centrifuged liquid extract projected towards the impact wall of the collecting unit. Other convection means can also be a steam flow in the air gap and/or contacting walls of the collecting unit.

For instance, the convection or conduction heat is taken from a heating block of high thermal inertia such as a thermoblock used for heating the liquid supplied in the brewing unit for brewing. Air or gas can be circulated in contact with the block and be channelled towards the brewing unit and/or collecting unit and/or the gap between the two. In another mode, a conductive or radiant heat transfer can be also made between the block and one of said unit. For instance, the metal block of high inertia is placed in contact or in radiant proximity with the wall of the receiving cavity of the collecting unit and/or drum of the brewing unit. These walls of the units are preferably made of a material of high thermal conductivity (preferably, above 100 W.m$^{-1}$.K$^{-1}$) such as in metal (stainless steel, aluminium, copper, etc.).

In general, the average thickness of the walls of the collecting unit in contact with the liquid extract are dimensioned below 2 mm, preferably below 1 mm, most preferably of about 0.5 mm. Indeed, it has been found particularly effective to reduce the heat dissipation of the liquid extract when contacting the walls of the collecting unit.

In a more specific example, the collecting unit comprises an annular U-shaped cavity formed of walls below 1 mm. The cavity is preferably surrounded on the outer surfaces of the walls by voids thereby limiting heat dissipation through masses of inertia of the device.

Preferably, the heating means for the extracted liquid is controlled to compensate for a temperature loss of the liquid of at least 2 degrees Celsius, preferably at least 5 degrees Celsius, most preferably between 8 and 15 degrees Celsius. The temperature loss is meant here to be the difference of the temperatures when 50 mL of coffee extract is dispensed from the device in 50-mL cup of glass material with and without the additional heating means.

For example, for a coffee extract, the brewing temperature of the liquid entering the brewing unit, is comprised within a range 75 and 95° C. More preferably, the device is configured to heat liquid in the heater so that the heated liquid is supplied in the brewing unit at a temperature between 90 and 95° C. The temperature range is selected to ensure an optimal extraction of the ingredients while avoiding burnt flavour notes that are not desired, in particular, for coffee.

In an another possible mode, the collecting unit of the device may comprise walls with heat insulating material and/or heat reflecting material for compensating the temperature loss in the collecting unit. Preferably, collecting unit is insulated for compensating at least 1 degree Celsius (Same conditions as aforementioned for the heating means).

For instance, the heat insulating material can comprise a liquid layer, a gas layer, foam, beads, fibres and any combinations thereof.

The additional heating means may also be obtained from a heating extension or derivation of the heater for heating the liquid supplied in the brewing unit.

The additional heating means can be independent from the heater for heating the liquid supplied in the brewing unit. By independent, it is meant that each heating means provides its own thermal production but may be connected to a same electrical supply.

In a possible mode, the additional heating means forms at least a heater for heating the liquid supplied in the brewing unit.

In a mode, the additional heating consists of a first heater for heating the liquid supplied in the brewing unit; said first heater being positioned in the fluid circuit upstream of a second heater for adjusting the temperature of the liquid injected in the brewing unit.

The additional heating means may also be provided by conduction or radiant proximity of the heater for heating the liquid supplied to the brewing unit. In a particular mode, the heater or an independent heating element is associated in radiant engagement with the drum of the brewing unit. For this the heater or independent heating element can be formed as a U-shaped heated mass of inertia, e.g., a thermoblock, placed a short distance, e.g., 0.2 to 5 mm, below the drum and surrounding the rotational guiding means of the drum.

The temperature of the additional heating means can also be controlled independently by a control unit and by suitable temperature sensors (e.g., NTC thermistors). The control unit may be the central controller of the device which provides different control functions such as the control of the pump of the liquid supply in the brewing unit and control the main liquid heater (e.g., thermoblock, cartridge heater, boiler, etc.).

In another aspect, the invention relates to a method for producing a liquid extract from food ingredients in a beverage producing device comprising a brewing unit driven in centrifugation comprising:
  providing food ingredients in the brewing unit,
  supplying heated liquid in the brewing unit,
  centrifuging the brewing unit thereby generating centrifugal forces forcing liquid to flow through the food ingredients,
  collecting the liquid extract in a collecting unit and,
  dispensing the liquid,
wherein it comprises at least one operation for compensating the thermal losses of the liquid extract in the brewing unit and/or in the collecting unit.

The centrifugal drive can be a rotational drive of the brewing unit along its central axis or eventually an offset axis. The motion may also be a non-circular rotation but, for instance, along a possibly elliptical path without departing from the scope of the invention.

The supply of liquid can be produced by a pump under pressure or by gravity feeding (e.g., dripping).

Preferably, the temperature of the liquid extract leaving the device is no more than 10 degrees lower, preferably no more than 8 degrees lower than the temperature of the supplied heated liquid in the brewing unit.

Preferably, the heated liquid is supplied in the brewing unit at a temperature between 70 and 95° C., preferably 90 and 95° C.

The method further consists in either one or a combination of any of the following operations:
  a) heating at least a part of the brewing unit which contains the food ingredients,
  b) heating at least a part of the collecting unit which collects the centrifuged liquid extract,
  c) heating the air gap between the brewing unit and the collecting unit
  d) heating the dispensing area for receiving the receptacle,
  e) Insulating or reflecting heat in the collecting unit and,
  f) reducing heat dissipation of the surfaces of contact of the collecting unit with the liquid extract by dimensioning the average thickness of the wall of the collecting unit in contact with liquid extract below 2 mm, preferably below 1 mm, most preferably of about 0.5 mm.

Preferably, the method according to the invention comprises at least one operation of heating the liquid extract after, when or before it leaves the brewing unit.

Detailed Description Of The Invention

Figure 1:
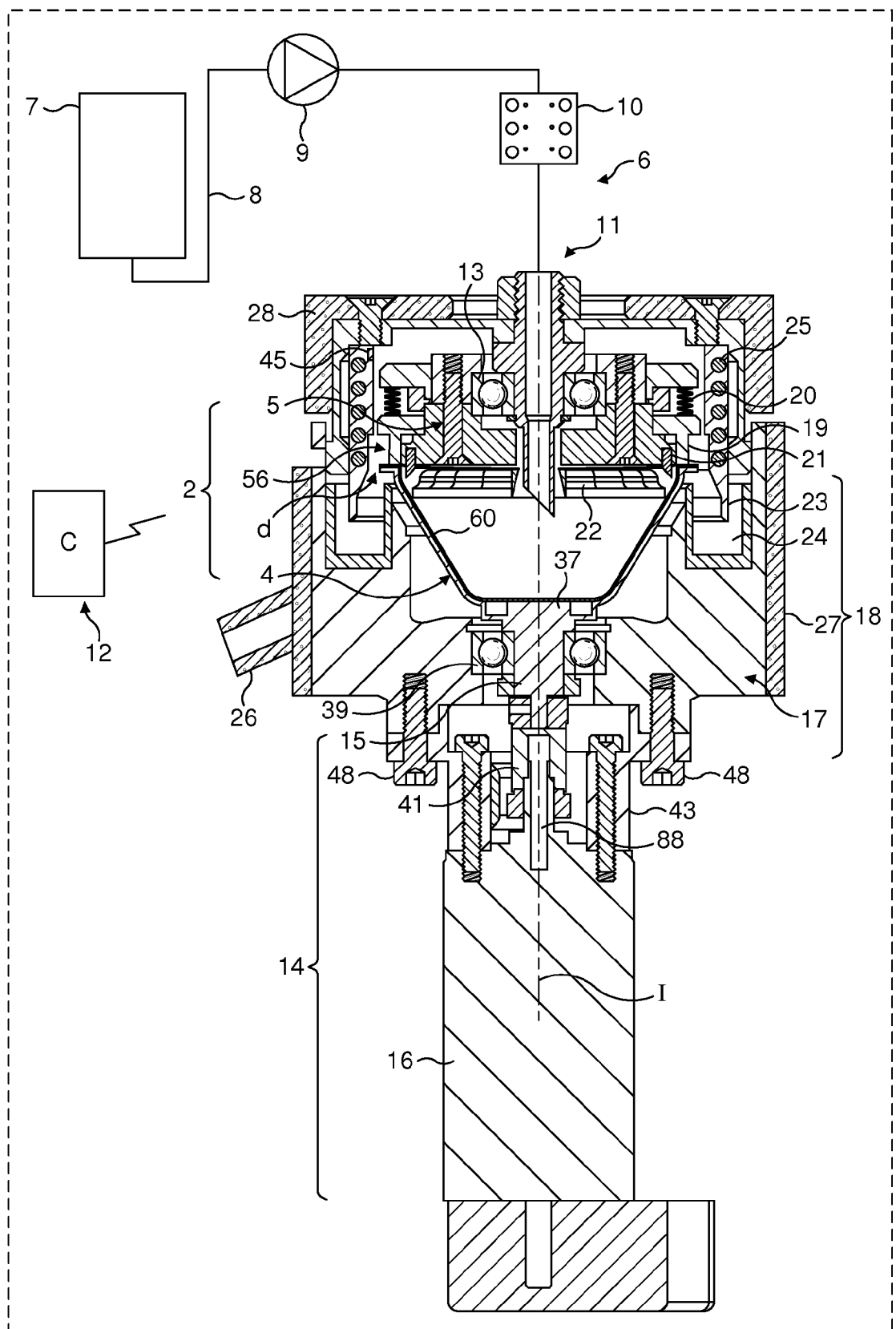
FIG. 1 represents a schematical view of the dispensing device of the present invention with a capsule inside according to a first exemplary mode.

The beverage production device 1 of the present invention illustrated in FIG. 1 is configured for preparing a liquid comestible also called liquid extract from the interaction of food ingredients and a liquid by centrifugation in a brewing unit 2. The effect of the centrifugal forces is used to provide the necessary fluid momentum through the ingredients in such a way that a liquid charged with ingredients solids, liquids and aroma compounds are extracted from the brewing unit. The terms "extraction" or "extract" are to be taken in a general meaning as a process or product resulting from the actions of brewing, dissolution, dilution, mixing, emulsifying and combinations thereof.

The brewing unit 2 usually comprises a drum 4 for receiving the food ingredients. The device may be configured to receive food ingredients packaged in a single-serve capsule 60 which takes place in the device when the device is opened. It should be noted that the drum may also be designed as a rotationally driving or driven ring with a central aperture allowing the bottom of the capsule to protrude downwardly. The ring can thus be designed to support the capsule at its side wall and/or rim.

At its top side, the brewing unit comprises a lid 5 which at least partially closes the drum so as to ensure an enclosure for the capsule inserted therein. The brewing unit is connected to a liquid supply assembly 6 configured to feed liquid in the brewing unit, more particularly, inside the capsule when inserted in the unit. For this, the liquid supply assembly comprises a liquid reservoir 7, a fluid circuit 8 with a pump 9 and a heater 10. The assembly ends by a liquid injector 11 which forms a tubular conduit projecting downwards in the brewing enclosure. The liquid supply assembly provides heated liquid in the brewing unit at a certain positive pressure from the reservoir. The liquid is preferably water and the temperature is typically an optimal temperature of brewing which may vary in function of the ingredients to be brewed. For coffee, the temperature may range from about 75 to 95 degrees Celsius. More preferably, the temperature of the supplied liquid is from about 90 to 95° C. to ensure an optimal quality extraction of the coffee. The temperature is here measured in the liquid injector 11 just before the liquid is fed in the capsule.

The water heater can be chosen amongst different heating modules such as a high-inertia thermal bloc (thermoblock), a cartridge heater, a boiler, an inline tube heater, etc. The pump can be any suitable pump such as a piston pump, a peristaltic pump, a diaphragm pump, a rotary pump, a gravity pump, etc.

The device further comprises a control unit 12 which is programmed to control the components of the device. In particular, the control unit 12 controls the activation of the pump 9 "on" and "off". This control may result from the activation of a command (e.g. button) on a key board or screen of the device (not shown). The control unit further controls the activation of the heater 10 "on" and "off" for raising the temperature of the liquid at the correct value in the brewing unit. A temperature control loop can be provided in the control unit with one or more temperature sensors placed in the fluid circuit, the brewing unit and/or onto the surface of the heater as known per se.

The liquid injector 11 is mounted in the brewing unit in a manner that the brewing unit can rotate along a central axis I around the injector 11 which is preferably fixed. More particularly, the lid 5 is mounted along ball bearing means 13 so that the lid can rotate when driven on rotation around the injector.

The brewing unit is driven in rotation during the centrifugal process by means of a driving unit 14. The driving unit is preferably connected to the drum 4 via a connecting part 15. The driving unit comprises an electrical motor 16 such as a direct current (DC) motor mounted onto a frame 17 of the device via bolts or the like. The motor 16 comprises a shaft 88 linked to the connecting part 15 via a suitable socket 41. It should be noted that the drum is also mounted in rotational linkage relative to the frame. For this, the connecting part 15 is mounted via ball bearing means 39 to the frame.

Therefore, the brewing unit 2 is rotatably mounted in the device, i.e., between the frame 17 and injector 11. The activation of the motor 16 is also controlled by the control unit 12 to drive the brewing in rotation during the centrifugal process. The speed of centrifugation is set by the controller according to a profile which may be constant or variable. In general, the speed during the extraction phase is between 1000 and 16000 rpm. The speed may be increased or decreased upon needs during the beverage preparation cycle by the control unit.

The liquid extract which is centrifuged in the brewing unit is collected by a collecting unit 18. The brewing unit is further preferably configured to leave a small interstice or liquid outlets at its periphery for the liquid extract to be centrifuged out of the unit. The interstice or liquid outlets is such that a certain pressure is created just upstream of the interstice or outlets, in the enclosure of the brewing unit, e.g., in the capsule. In a preferred mode, a valve means 56 is provided which opens the brewing unit only when a sufficient pressure of liquid is exerted at the inside periphery of the brewing unit. The valve means 56 can be formed by a ring portion 19 which applies a closing force onto the drum and/or edge of the capsule. The valve means further comprises an elastic biasing member 20 which maintains the ring portion in closure tension. The biasing member can be a spring, a rubber elastic or an hydraulic pressure means. The ring portion forms a continuous gap when the valve means is opened by the pressure of the centrifuged liquid. The flow gap or restriction may be very small in width (w), for instance, between 0.01 and 0.5 mm but of a continuous perimeter along the whole periphery of the ring portion. The surface area (S) of the flow gap or restriction may so be calculated by the formula: $S=2.\Pi.R.w$, where R is the radius of the ring portion and "w" represents the opening width of the valve means. The surface area of the gap can range between 1 and 500 $mm^2$. The surface area varies with the rotational speed such that, usually, the higher the rotational speed the larger the area.

As illustrated in FIG. 1, the lid may further comprise piercing members 21 for piercing several outlets in a wall of the capsule. The piercing members may be placed at the periphery of the lid and directed downwardly in direction of the enclosure. As also apparent in the figure, the capsule may optionally comprise a filter part 22 for separating a main chamber containing the ingredients, e.g., ground coffee, and a small peripheral collecting recess adjacent the pierced upper wall of the capsule. The recess in the capsule is so deep enough, e.g., 5-10 mm, to enable the piercing members to be introduced in the capsule for forming the several outlets.

The collecting unit 18 of the device forms peripheral walls surrounding the brewing unit to collect the liquid which is centrifuged through the small interstice or outlets. In particular, the collecting unit comprises a first impact wall 23 placed at a certain distance or air gap (d) from the brewing unit, in particular, the restriction valve. This impact wall can be a tubular wall forming a surface of impact for the liquid and that extends downwards in a U-shaped collecting part 24 of the collecting unit. The U-shaped collecting part 24 forms a part of the frame 17 or is connected to the frame of the device.

According to one aspect of the invention, additional heating means are provided in association with the collecting unit. The heating means maintains at least one wall of the unit above ambient temperature. More particularly, at least one electrical resistance wire 25 is embedded in the impact wall 23 of the collecting unit. The resistance may, for instance be formed as coil or as several portions of coils. The resistance wire can also be replaced by one or more a thick film, ceramic cartridge(s), an induction coil and/or a heated fluid coiled conduit wherein heated fluid (liquid or gas) is circulated to maintain the impact wall above ambient temperature. Therefore, when the liquid is centrifuged at high velocity out of the brewing unit through the restriction valve, it impacts on a heated surface. The liquid is then collected in the U-shaped collecting part 24.

In a possible variant, this is the collecting part 24 which is heated by similar heating means (wire resistance, thick film, ceramic cartridge(s), induction coil, fluidic radiating coils). In one mode, the impact wall is not heated and only the collecting part 24 of the collecting unit is heated. Such configuration reduces the risk of breaking the coffee foam ("crema") during the centrifugal projection of the liquid extract from the brewing unit. In another mode, both the impact wall and the collecting part are heated.

The collected liquid is so maintained at a sufficiently hot temperature for service (e.g., 60-90° C.) and the temperature losses are so minimized or even better, are suppressed.

The collected liquid is then dispensed via at least one discharge duct 26. In the context of the present invention, the discharge duct is considered as part of the collecting unit.

In additional or in an alternative to the additional heating means 25 as described, the collecting unit is heat insulated with at least one heat insulating layer such as a thick plastic foam layer 27. The insulating layer may further extend to the lid as illustrated by upper insulating layer 28. Suitable insulating materials can be foam, fibres, beads, a fluid (gas or liquid) cushion between two wall, a heat reflecting material and combinations thereof.

Figure 2:
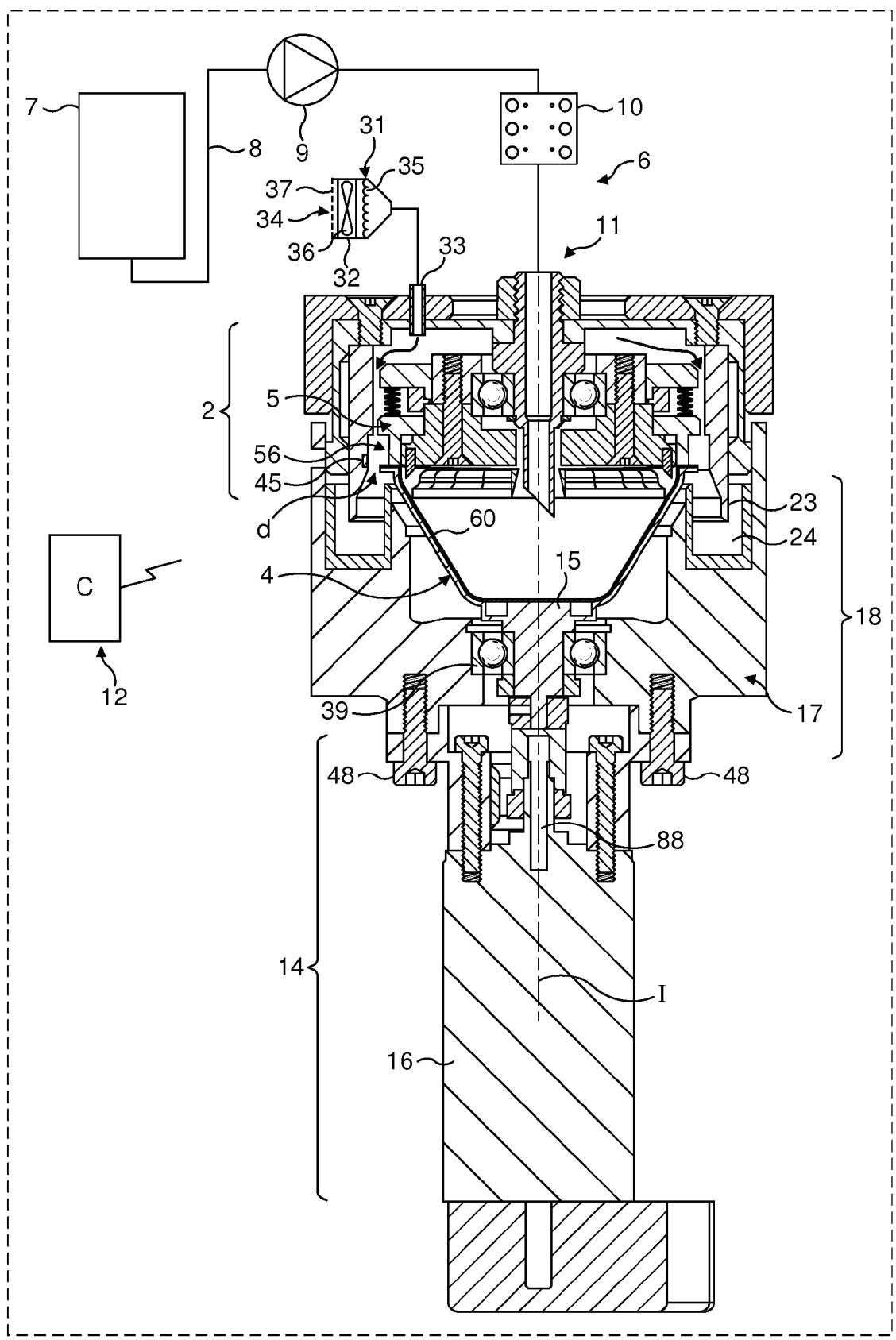
FIG. 2 represents a schematical view of the device according to a second exemplary mode.

FIG. 2 illustrates another embodiment of the invention in which the same numerical references have been used to indicate the same or similar technical means. The difference here lies essentially in the type of additional heating used for at least partially compensating the heat loss of the liquid extract coming out of the brewing unit. The additional heating unit 31 is an heated air blowing device for directing or circulating heated air in the air gap (d) between the brewing unit and the impact wall 23. The device may comprise a casing 32 forming a chamber, an air outlet conduit 33 and an air inlet 34. A heating element 35, e.g., a heating wire is provided in the casing downstream to an air circulating means 36 such as a fan. The device may be provided with an air filter 37 placed in the air circuit to filter the dust or other particles which could enter in contact with the liquid extract.

Instead of a air-forced circulating device, the device could consist more simply in a circulation means based on non-mechanically forced air current with a heating means such as wire(s) placed in the path of the air current. The device can also be a steam generator producing a hot steam environment.

In another possible variant, the additional heating means may be one or more heating surfaces of the liquid heater 10 itself. For instance, the air blowing device is integrated as a part of the thermoblock, e.g., on one of its side.

Figure 3:
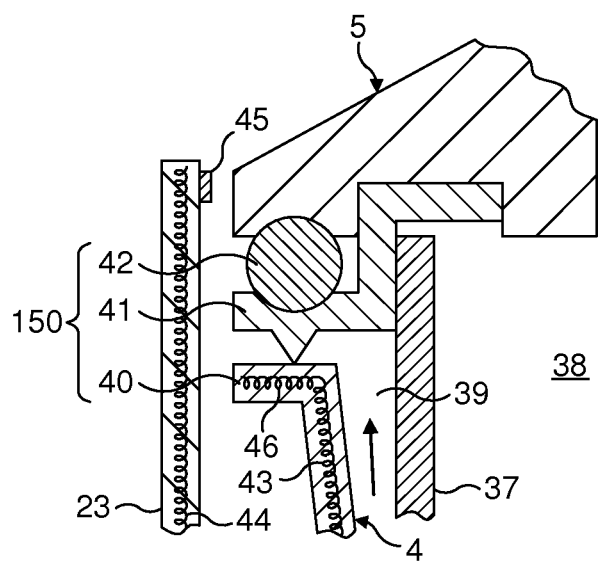
FIG. 3 represents a detail view of the device according to a third exemplary mode, FIG. 4 represent a schematical view of the device according to a fourth exemplary mode.

As illustrated in FIG. 3, the brewing device may also be configured to receive loose ingredients such as coffee powder which is not packaged in a capsule. For this, the brewing device comprises a drum 4 and a filter 37 such as a screen cylinder which is placed between a ingredients' cavity 38 and a collecting cavity 39. The drum may have a widening form in direction of the restriction to enable the liquid to exit the restriction such as formed by a valve means 150. As shown as an example, the valve means in general may be of a different configuration. For instance, the valve means comprises a rim portion 40 of the drum, a closure gate portion 41 which is maintained under pressure by an elastomeric O-ring 42 placed between the lid 5 and said portion 41.

The additional heating means of the beverage device as shown in FIG. 3 can also be associated to the drum 4. For instance, a heating resistance 44 can be embedded in the widening walls 43 and/or rim portion 40 of the drum. Of course, the heating means can also be a thick film which is placed against the drum's walls or inserted in. As liquid is extracted from the filter 37 as a result of the centrifugal forces, it is collected in the collecting cavity 39 and flows upwardly against the heated walls 43, 40. Therefore, the temperature of the liquid can be maintained high when still in the brewing unit but after filtration. In addition or, as an alternative, the impact wall 23 is also associated to heating elements 44 such as a second heating resistive wire or thick film(s). As a result, the liquid extract which passes through the valve means under a thin layer or jets impacts on heated surface. This also contributes to maintain the temperature of the liquid sufficiently high and reduce or eliminate the heat losses.

Figure 4:
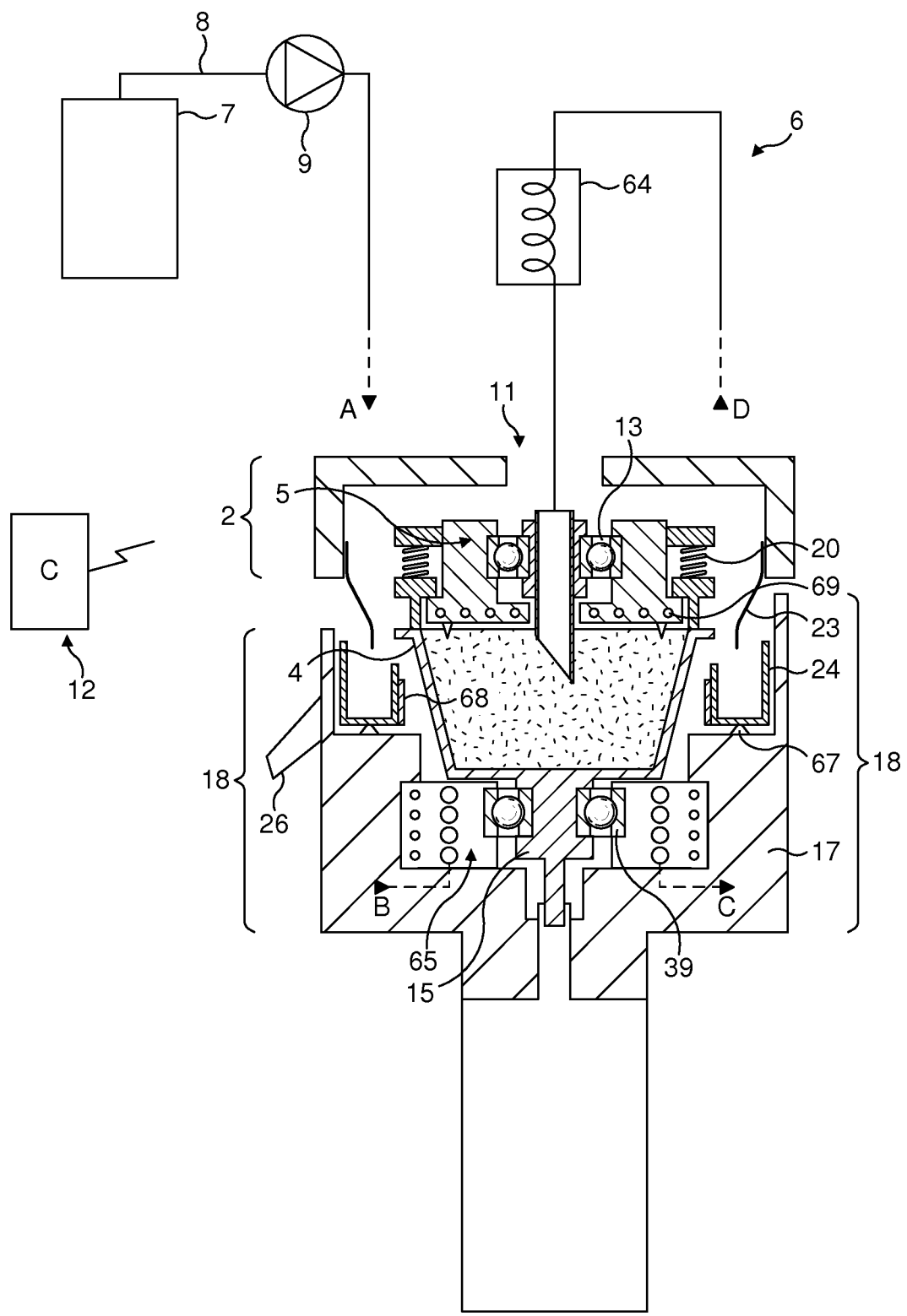

FIG. 4 illustrates another possible of the device of the invention. Again the same numerical references have been used for designating the same or equivalent technical means as in the previous embodiments. The difference here lies in that a heating element 65 is provided in radiant arrangement with the drum 4 of the device. The drum can be configured to receive a capsule as described earlier or alternatively food ingredients directly. The heating element 65 is fixedly mounted in the frame 17 of the collecting unit 18. The smallest possible gap is maintained between the heating element 65 and the outer surface of the drum, e.g., its bottom surface, to ensure an effective radiant heat transfer. The element 65 is also mechanically linked to the drum via the ball bearing 39 so that the drum potentially provides heat by conduction through the bearing and connecting part 15. The heating element 65 preferably supplies heated liquid to the injector means 11. However, it may also be a derivation or extension of the main heater or an independent heater.

In the illustrated example of FIG. 4, cold liquid coming from reservoir 7 is pumped by pump 9 and supplied (A-B way) to the heating element 65 for raising its temperature to a first value, e.g., 60-90° C. Transfer by radiation occurs between element 10 and drum during this stage causing possible drop of the liquid temperature of several degrees. Then liquid is supplied to second heating element 64 (C-D way) to compensate for the heat loss and set the optimal temperature of the liquid, e.g., 92+/−2 degrees, before its injection in the brewing unit.

Preferably, the first heating element 65 is a thermoblock. Of course, the heating element can also be replaced by another heating element capable of producing an effective radiant effect such as an infra-red heater.

The second heater 64 can also be a thermoblock or an ODH ("On Demand Heater") such as a cartridge (e.g., described in EP1913851) or a tube heater embedding one or more thick film or resistor (e.g., described in EP1253844 or EP1380243).

In a possible mode of FIG. 4, the second heater is omitted and water produced for the beverage is heated by a single heater 65 only providing the additional heating means for compensating heat loss of the liquid extract. Of course, in another possible configuration, the heater 65 can also be placed physically in contact or in radiant proximity with the collecting part 24.

Thermoblocks are typically in-line heaters through which a liquid is circulated for heating. They comprise a heating chamber, such as one or more ducts, in particular made of steel, extending through a (massive) mass of metal, in particular made of aluminium, iron and/or another metal or an alloy, that has a high thermal capacity for accumulating heat energy and a high thermal conductivity for transfer of the required amount of accumulated heat to liquid circulating therethrough whenever needed. Instead of a distinct duct, the thermoblock's duct may be a through passage that is machined or otherwise formed in the duct's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct(s) may have a helicoidal or another arrangement along the thermoblock to maximise its/their length and heat transfer through the block.

In the mode of FIG. 4 (but applicable to all other modes as well), the heat loss can be significantly reduced in the collecting unit by dimensioning the impact wall 23 and/or of the wall of the receiving cavity 24 (also called "collecting part" in the present description) at an average thickness below 2 mm, preferably below 1 mm, most preferably between 0.2 and 0.7 mm, e.g., about 0.5 mm. In particular, the wall of the receiving cavity 24 is designed as an annular U-like form. It can be a curved metal foil such as copper, steel or aluminium or plastic. A heat insulation, preferably a void is present between the outer surface of the wall in the form of an air gap to limit the dissipation of heat in other parts of the device. The wall of the cavity can thereby be supported by narrow links 67 (e.g., studs, rubber pads, etc.) to the frame 17 of the unit. The impact wall is also designed within a small average thickness range (preferably 1-0.5 mm). It can be a curved metal foil such as made of copper, steel or aluminium or a plastic.

A heating element 68 can be associated to the receiving cavity 24 of the collecting unit. The element ensures that the liquid extract stopped by the impact wall is maintained within the required temperature. Such element can be a thick film for instance connected on the external surface of the cavity. Preferably, the impact wall is free of any heating element because we have surprisingly noticed that the amount and/or quality of foam (also called "crema") is negatively affected when this wall is heated. It may be that the heat makes the foam bubbles collapse during impact. Therefore, in the preferred mode, the impact wall is not heated.

Finally, the lid 5 may as well be provided with an additional heating element 69 such as resistive wires or a thick film. The lid 5 thereby transfers heat to, or at least reduces heat losses, by conduction with the upper surface of the capsule. Therefore, the capsule can be maintained warm from its outside through the heated drum and/or the heated lid. The capsule can also be preferably made of a material that conducts heat such as aluminium or a combination of aluminium and plastic.

It can also be desirable to provide heat reflective walls of the device that can minimize conduction of heat therethrough and can reflect heat towards the liquid extract. Such surfaces may be made, for example, of polymeric support including metallic reflective pigments or coated with a thin metallic membrane (e.g., alu membrane).

In all the described embodiments, the additional heating means can be controlled by the control unit which regulates the heating with a proper temperature range using temperature sensors 45 (e.g., NTC sensors) placed on the heated surfaces and/or on heating elements and/or in the liquid directly. The heating elements can so be switched "on" and "off" based on the signals of the temperature sensors received by the control unit.

In order to reduce the energy consumption, the control unit can regulate the additional heating elements to be active only during certain periods, e.g., during the rotational cycle of the brewing unit. The heating elements and surface materials may also be chosen to bring the heating surfaces at the desired temperature instantaneously (in the order of several milliseconds). The device may also be controlled to fall into an energy saving mode in which only a part of the heating elements are automatically switched off when the device is not activated for a predetermined period of time.

Of course, different heating elements can be combined such as radiant and convection-type heating elements.

What is claimed is:

1. A beverage production device for preparing a liquid extract by interaction between a liquid and food ingredients to form the liquid extract by centrifugation of the liquid passing through the ingredients, comprising:
   a centrifugal brewing unit for receiving the food ingredients,
   a collecting unit for collecting the liquid extract centrifuged outside the centrifugal brewing unit, with the collecting unit having an impact wall forming a surface of impact for the centrifuged liquid extract and a receiving cavity which is a member that is separate from and is located below the impact wall for receiving the liquid extract impacted on the impact wall,
   driving means connected to the centrifugal brewing unit for driving the centrifugal brewing unit in rotation,
   liquid supply means being connected to the centrifugal brewing unit to supply liquid in the centrifugal brewing unit,
   a heater for heating the liquid supplied in the centrifugal brewing unit to a brewing temperature, and
   additional heating means arranged to heat the liquid extract;
   wherein the additional heating means is separated from the heater and includes a heating element that is (a) in contact with the receiving cavity or (b) is a thermoblock located below the impact wall and below but in thermal association with the receiving cavity, wherein the heating element of (a) or (b) provides heat to the extract in the receiving cavity after its formation and collection without heating the impact wall, so that the liquid extract leaving the centrifugal brewing unit has a temperature that is near the temperature of the liquid supplied to the centrifugal brewing unit.

2. The beverage production device according to claim 1, wherein the additional heating means comprises any one or a combination of convection heating elements, radiant heating elements or conduction heating elements.

3. The beverage production device according to claim 2, wherein the additional heating means comprises an electrical resistance, a thick film, a hot air blower, a heat exchanger, a steam generator, an induction coil, an infrared heater, or any combination of the foregoing.

4. The beverage production device according to claim 1, wherein the brewing unit comprises a rotating drum and a lid at least partially closing the rotating drum wherein at least one of the rotating drum or lid is thermally associated with the additional heating means.

5. The beverage production device according to claim 1, wherein the receiving cavity has an annular U-shaped wall and the impact wall is a member that is spaced from and surrounds the centrifugal brewing unit and is situated above the U-shaped wall so that the receiving cavity can receive extract that exits the brewing unit, contacts the impact wall and thereafter falls into the U-shaped wall.

6. A beverage production device for preparing a liquid extract by interaction between a liquid and food ingredients to form the liquid extract by centrifugation of the liquid passing through the food ingredients, comprising:
   a centrifugal brewing unit for receiving the food ingredients,
   a collecting unit for collecting the liquid extract centrifuged outside the centrifugal brewing unit,
   driving means connected to the centrifugal brewing unit for driving the centrifugal brewing unit in rotation,
   liquid supply means being connected to the centrifugal brewing unit to supply liquid in the centrifugal brewing unit,
   a heater for heating the liquid supplied to the centrifugal brewing unit to a temperature of between 70 and 95° C., and
   additional heating means for heating the extract,
   wherein the collecting unit comprises an impact wall that is spaced from and surrounds the centrifugal brewing unit forming a surface of impact for the centrifuged liquid extract, a collecting cavity of annular shape and at least one dispensing duct, wherein the collecting cavity and dispensing duct are located below the impact wall for receiving the liquid extract impacted on the impact wall, and wherein the additional heating means includes a heating element that is (a) is in contact with the collecting cavity or the dispensing duct, or (b) is a thermoblock located below the impact wall and below but in thermal association with the collecting cavity or dispensing duct, wherein the heating element of (a) or (b) provides heat to the extract in the collecting cavity or dispensing duct after its formation and collection without heating the impact wall.

7. The beverage production device according to claim 1, wherein the walls of the collecting unit in contact with the liquid extract have a thickness of less than 2 mm.

8. The beverage production device according to claim 1, wherein the collecting unit comprises walls with heat insulating material or heat reflecting material for compensating for a temperature loss in the collecting unit of at least 1 degree Celsius.

9. The beverage production device according to claim 1, wherein the additional heating means is obtained from a heating extension or a derivation of the heater for heating the liquid extract in the receiving cavity.

10. The beverage production device according to claim 6, wherein the additional heating means is independent from the heater for heating the liquid supplied to the centrifugal unit.

11. The beverage production device according to claim 1, wherein the additional heating means forms at least part of a heater for heating the liquid supplied to the centrifugal unit.

12. The beverage production device of claim 1 wherein the heater supplies sufficient heat to the liquid supplied to the centrifugal brewing unit to heat it to a brewing temperature of between 70 and 95° C., and the liquid extract leaving the centrifugal brewing unit has a temperature that is no more than 8 degrees lower than the temperature of the liquid supplied to the centrifugal brewing unit.

13. The beverage production device of claim 1 wherein the impact wall is dissociated from the heater and spaced from the receiving cavity.

* * * * *

UNITED STATES PATENT AND TRADEMARK OFFICE
CERTIFICATE OF CORRECTION

| | | |
|---|---|---|
| PATENT NO. | : 9,265,376 B2 | Page 1 of 1 |
| APPLICATION NO. | : 13/148178 | |
| DATED | : February 23, 2016 | |
| INVENTOR(S) | : Perentes et al. | |

It is certified that error appears in the above-identified patent and that said Letters Patent is hereby corrected as shown below:

In the claims

Column 11:
Line 42 after "supplied", change "in" to -- to --.
Line 46 after "heating means is", change "separated" to -- separate --.

Signed and Sealed this
Tenth Day of May, 2016

Michelle K. Lee
*Director of the United States Patent and Trademark Office*